US012603397B2

(12) United States Patent
Park et al.

(10) Patent No.: US 12,603,397 B2
(45) Date of Patent: Apr. 14, 2026

(54) SEAM WELDING STRUCTURE OF BATTERY CAN, CURRENT COLLECTING PLATE, AND CAP AND BATTERY CELL USING THE SAME

(71) Applicant: LG Energy Solution, Ltd., Seoul (KR)

(72) Inventors: Jeongho Park, Daejeon (KR); Dongsung Hwang, Daejeon (KR); Sungmin Cho, Daejeon (KR); Taerim Hong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/657,490

(22) Filed: May 7, 2024

(65) Prior Publication Data

US 2024/0380079 A1 Nov. 14, 2024

(30) Foreign Application Priority Data

May 8, 2023 (KR) ........................ 10-2023-0059345
Oct. 11, 2023 (KR) ........................ 10-2023-0135319

(51) Int. Cl.
*H01M 50/536* (2021.01)
*H01M 4/70* (2006.01)
(Continued)

(52) U.S. Cl.
CPC ..... *H01M 50/536* (2021.01); *H01M 10/0422* (2013.01); *H01M 50/152* (2021.01);
(Continued)

(58) Field of Classification Search
CPC ......... H01M 10/0422; H01M 10/0431; H01M 10/0587; H01M 2220/20; H01M 4/70;
(Continued)

(56) References Cited

U.S. PATENT DOCUMENTS

| 2005/0214640 A1 | 9/2005 | Kim |
| 2008/0131767 A1 | 6/2008 | Kim |

(Continued)

FOREIGN PATENT DOCUMENTS

| CN | 209133626 U | 7/2019 |
| CN | 215342752 U | 12/2021 |

(Continued)

OTHER PUBLICATIONS

Extended European Search Report including Written Opinion for Application No. 24174303.8 dated Oct. 22, 2024, pp. 1-9.

(Continued)

*Primary Examiner* — Lingwen R Zeng
(74) *Attorney, Agent, or Firm* — Lerner David LLP

(57) ABSTRACT

A battery cell includes: a can with an electrode assembly received therein, in which the can has a bottom member, a sidewall member connected to the bottom member and extending upwardly therefrom in an axial direction, and a cap covering an open end of the can at an axial end opposite to the bottom member. A current collector plate is connected to an electrode tab of the electrode assembly proximate the open end. The current collector plate includes: a central portion electrically connected to the electrode tab and a peripheral portion in electrical contact with a radially inner surface of the sidewall of the can. The peripheral portion is also in contact with an underside of the cap. The radially inner surface of the sidewall member, a radially outer surface of the cap, and the peripheral portion of the current collector plate are all welded to one another.

18 Claims, 14 Drawing Sheets

(51) Int. Cl.

| | |
|---|---|
| *H01M 10/04* | (2006.01) |
| *H01M 50/152* | (2021.01) |
| *H01M 50/169* | (2021.01) |
| *H01M 50/107* | (2021.01) |
| *H01M 50/119* | (2021.01) |
| *H01M 50/133* | (2021.01) |
| *H01M 50/159* | (2021.01) |
| *H01M 50/538* | (2021.01) |
| *H01M 50/545* | (2021.01) |
| *H01M 50/552* | (2021.01) |

(52) U.S. Cl.

CPC ............ *H01M 50/169* (2021.01); *H01M 4/70* (2013.01); *H01M 10/0431* (2013.01); *H01M 50/107* (2021.01); *H01M 50/119* (2021.01); *H01M 50/133* (2021.01); *H01M 50/159* (2021.01); *H01M 50/538* (2021.01); *H01M 50/545* (2021.01); *H01M 50/552* (2021.01); *H01M 2220/20* (2013.01); *Y02E 60/10* (2013.01)

(58) Field of Classification Search

CPC ............. H01M 50/107; H01M 50/119; H01M 50/133; H01M 50/152; H01M 50/159; H01M 50/169; H01M 50/533; H01M 50/536; H01M 50/538; H01M 50/545; H01M 50/552; Y02E 60/10

See application file for complete search history.

(56) References Cited

U.S. PATENT DOCUMENTS

| | | | |
|---|---|---|---|
| 2022/0231345 A1 | 7/2022 | Hwangbo et al. | |
| 2023/0006289 A1* | 1/2023 | Cho .................... | H01M 50/548 |
| 2023/0207992 A1 | 6/2023 | Fang et al. | |
| 2023/0231242 A1 | 7/2023 | Kim et al. | |
| 2023/0231246 A1 | 7/2023 | Jung | |
| 2024/0006694 A1 | 1/2024 | Sun et al. | |

FOREIGN PATENT DOCUMENTS

| | | | |
|---|---|---|---|
| CN | 216085238 U | 3/2022 |
| CN | 114628866 A | 6/2022 |
| CN | 115117524 A | 9/2022 |
| CN | 115275464 A | 11/2022 |
| EP | 4113712 A1 | 1/2023 |
| KR | 2005-0094662 A | 9/2005 |
| KR | 100814853 B1 | 3/2008 |
| KR | 20200087562 A | 7/2020 |
| KR | 2022-0108011 A | 8/2022 |
| KR | 2022-0132994 A | 10/2022 |
| KR | 20230003992 A | 1/2023 |
| KR | 2023-0048045 A | 4/2023 |
| KR | 102530339 B1 | 5/2023 |

OTHER PUBLICATIONS

International Search Report for Application No. PCTKR2024006147 mailed Aug. 28, 2024. 3 pgs.

* cited by examiner

20

27

28

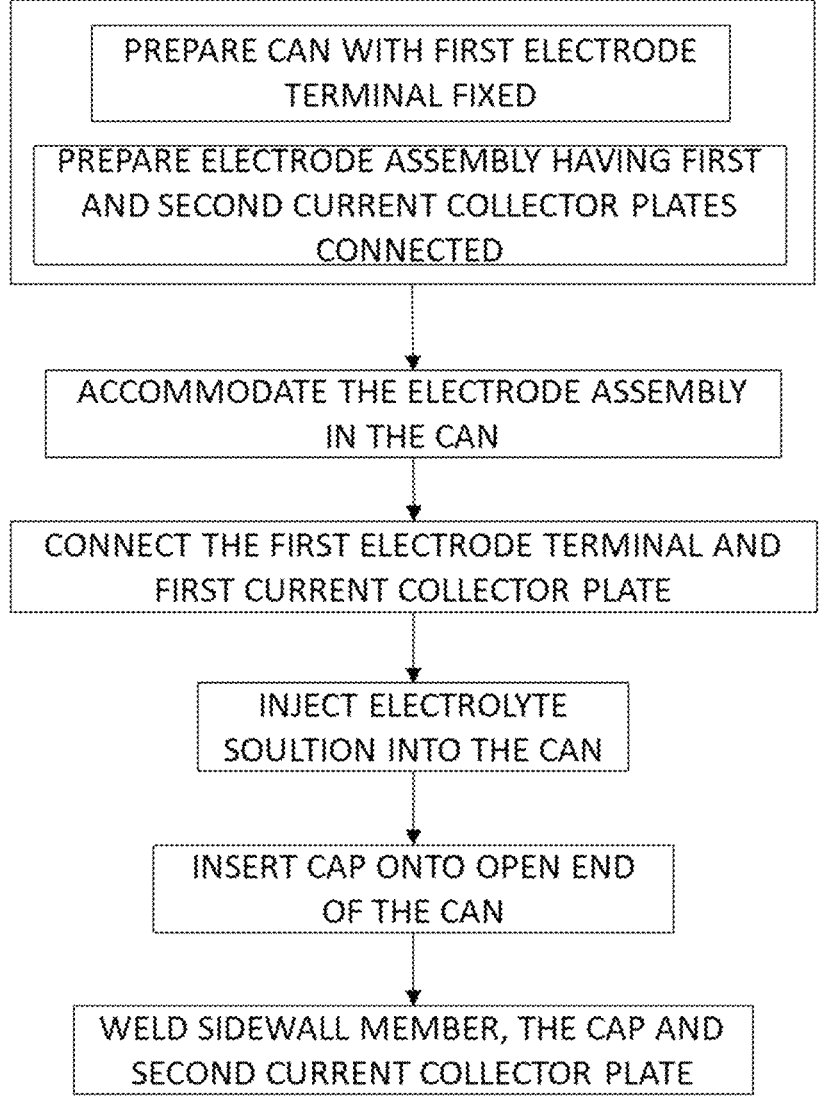

PREPARE CAN WITH FIRST ELECTRODE
TERMINAL FIXED

PREPARE ELECTRODE ASSEMBLY HAVING FIRST
AND SECOND CURRENT COLLECTOR PLATES
CONNECTED

ACCOMMODATE THE ELECTRODE ASSEMBLY
IN THE CAN

CONNECT THE FIRST ELECTRODE TERMINAL AND
FIRST CURRENT COLLECTOR PLATE

INJECT ELECTROLYTE
SOULTION INTO THE CAN

INSERT CAP ONTO OPEN END
OF THE CAN

WELD SIDEWALL MEMBER, THE CAP AND
SECOND CURRENT COLLECTOR PLATE

FIG. 16

SEAM WELDING STRUCTURE OF BATTERY CAN, CURRENT COLLECTING PLATE, AND CAP AND BATTERY CELL USING THE SAME

CROSS-REFERENCE TO RELATED PATENT APPLICATION

This application claims the benefit of priority based on Korean Patent Application No. 10-2023-0059345, dated May 8, 2023, and Korean Patent Application No. 10-2023-0135319, dated Oct. 11, 2023, the entire contents of each of which is incorporated by reference herein.

BACKGROUND

The present disclosure relates to the field of batteries, and in particular a welding structure of a battery can, a current collector plate, and a cap, as well as a battery cell to which the same is applied.

The process of manufacturing a battery cell having a cylindrical can includes deep drawing a metal sheet to form a circular bottom and a circular tube-shaped sidewall member connected to the circular bottom, followed by accommodating the electrode assembly in the can, and then covering the open end of the sidewall member with a cap.

Meanwhile, a current collector plate, which is in contact with and electrically connected to at least one electrode tab of the electrode assembly, is provided at one of two axial ends of the electrode assembly—namely the one that faces the open end. The current collector plate is in contact with and electrically connected to the cap or the sidewall member through a method wherein the current collector plate is welded to the cap or the sidewall member.

In the process of welding the current collector plate to the cap or the sidewall member, the current collector plate may be maintained in close contact with the cap or sidewall member. In order to achieve this, a jig that maintains the current collector plate in close contact with the cap or the sidewall member may be necessary, and in addition, a mask exposing the welding area is may also be necessary.

In order to maintain the current collector plate to the cap or the sidewall member through the mask or the jig, a space for accommodating the mask or the jig may be provided in the can. However, such space will remain empty after the mask or the jig is removed, resulting in reduced efficiency of utilization of the internal volume of the can. This hinders the energy density per unit volume of the can.

In addition, in completing the assembly of the cylindrical can, a process of connecting the current collector plate to the cap or the sidewall member and a process of connecting the cap to the sidewall member are performed separately. This increases the man-hours involved in assembling the battery cell components, which reduces the production efficiency of the cylindrical battery cells and increases the production cost.

SUMMARY OF THE DISCLOSURE

In order to address at least some of the above-mentioned problems, the present disclosure provides a welding structure of a battery can, current collector plate, and cap, and a battery cell to which the same are applied, wherein it is possible to obtain increased energy density per volume without wasting or sacrificing the internal volume of the can, such as by omitting a separate welding mask or jig in the process of welding the current collector plate to the can).

Additionally, or alternatively, the present disclosure may include integrating the process of welding the current collector plate to the can and the process of welding the cap to the sidewall member into a single welding process, which may beneficially increase production efficiency and reduce production cost.

In addition, or alternatively, the can, the current collector plate, and the cap may function as a mask and jig in accordance with the present disclosure, which may beneficially to increase the stability of the process. The shapes and/or engagement relationships between the can, the current collector plate, and the cap of the present disclosure may also beneficially increase the effectiveness and/or durability of the welds, and/or may increase process stability.

The technical problems solved by the present disclosure are not limited to the objects described above, however, but rather other objects and advantages of the present disclosure that are not described may be understood through the following description and examples.

In accordance with one aspect of the present disclosure, a battery cell is provided. The battery cell may include a can, an electrode assembly, a current collector plate, and a cap. The can may have a sidewall circumscribing an internal volume and defining an opening to the internal volume at a first end of the can along a central longitudinal axis. The electrode assembly may be received within the internal volume of the can. The cap may cover the opening of the can so as to enclose the internal volume. The current collector plate may be electrically connected to the electrode assembly. Further, the current collector plate may include a central portion and a peripheral portion, where the peripheral portion is positioned around the central portion and is spaced further from the central longitudinal axis than the central portion. The central portion may be electrically connected to an electrode tab of the electrode assembly. The peripheral portion may be in contact with a radially inner surface of the sidewall so as to be electrically connected with the can, and the peripheral portion may be in contact with an underside of the cap, where the underside of the cap faces into the internal volume along an axial direction that extends parallel to the central longitudinal axis. The radially inner surface of the sidewall, a radially outer surface of the cap, and the peripheral portion of the current collector plate are preferably welded to one another.

According to some aspects of the battery cell, the radially inner surface of the sidewall may include a lateral step extending transverse to the central longitudinal axis. The lateral step may result in a first inner surface of the sidewall positioned on a first side of the lateral step in the axial direction having a first diameter and a second inner surface of the sidewall positioned on a second side of the lateral step in the axial direction having a second diameter, where the second side of the lateral step is closer to the opening of the can than the first side. Moreover, the second diameter of the second side may be larger than the first diameter of the first side. Further, the radially outer surface of the cap and the peripheral portion of the current collector plate may be in contact with the second inner surface.

According to some of the above aspects of the battery cell, an outer diameter of the peripheral portion of the current collector plate may be larger than the first diameter of the first inner surface of the sidewall of the can. According to some other of the above aspects of the battery cell, the peripheral portion of the current collector plate may be in contact with the lateral step. According to yet some other of the above aspects of the battery cell, the lateral step may be defined by an oblique surface extending from the first diameter of the first inner surface to the second diameter of the second inner surface. According to even others of the above aspects of the battery cell, a first thickness of the cap in the axial direction along the radially outer surface is larger than a second thickness of the sidewall in a radial direction along the second inner surface, where the radial direction is perpendicular to the central longitudinal axis. According to some of such aspects, the first thickness may be between one and two times thicker than the second thickness.

According to some aspects of the battery cell, a diameter of the radially outer surface of the cap may be smaller than a diameter of an adjacent portion of the radially inner surface of the sidewall. Moreover, a welded region may extend from the adjacent portion of the radially inner surface of the sidewall to the radially outer surface of the cap.

According to some aspects of the battery cell, the cap may include an annular region extending along the radially outer surface. Moreover, a thickness of the annular region of the cap along the axial direction may be smaller than a thickness of a central region of the cap, which central region is positioned along the central longitudinal axis. According to some of such aspects, an inclined surface along the underside of the cap may connect the annular region and the central region. According to yet further aspects, the inclined surface may contact the current collector plate.

According to some aspects of the battery cell, the current collector plate may include a step in the axial direction between the central portion and the peripheral portion, such that the peripheral portion is offset towards the opening of the can relative to the central portion.

According to some aspects of the battery cell, a longitudinal dimension of the central portion of the current collector plate may extend transverse to the axial direction, and a longitudinal dimension of the peripheral portion of the current collector plate may extend parallel to the axial direction. As such, the peripheral portion may extend along the radially inner surface of the sidewall of the can to a terminal end of the peripheral portion, where that terminal end abuts the underside of the cap.

In accordance with another aspect of the present disclosure, a method of manufacturing a battery cell is provided. The method may include positioning a cap and a current collector plate in an assembled position stacked on one another within an opening of a can. In such assembled position, the current collector plate may be electrically connected to an electrode assembly received within an internal volume of the can. Moreover, in such assembled position, a peripheral portion of the current collector plate may be in contact with a radially inner surface of a sidewall of the can surrounding the opening. Furthermore, in such assembled position, the cap may be positioned above the current collector plate along a central longitudinal axis of the can, such that the cap is further from the electrode assembly than the current collector plate. Preferably, the method also includes the step of welding the radially inner surface of the sidewall, a radially outer surface of the cap, and the peripheral portion of the current collector plate to one another.

According to some aspects of the method, positioning the cap and the current collector plate in the assembled position may include bringing the peripheral portion of the current collector plate into contact with a lateral step defined on the radially inner surface of the sidewall of the can.

According to some aspects of the method, positioning the cap and the current collector plate in the assembled position may include bringing an inclined surface positioned along an underside of the cap into contact with an annular portion of the current collector plate extending along the peripheral portion.

According to some aspects of the method, welding the radially inner surface of the sidewall of the can may include melting the material of an extension of the sidewall which projects above the cap along an axial direction that extends parallel to the central longitudinal axis. As a result, the material of the extension may flow between the radially inner surface of the sidewall and the radially outer surface of the cap so as to join them together.

According to some aspects of the method, welding the radially inner surface of the sidewall may include tack welding at a plurality of discrete locations spaced apart from one another along the sidewall in a circumferential direction about the central longitudinal axis. The method may further include performing continuous welding along the sidewall so as to form a weld substantially encircling the cap in the circumferential direction.

According to some aspects of the method, positioning the cap and the current collector plate in the assembled position may include inserting the electrode assembly with the current collector plate bonded thereto into the internal volume of the can. According to some further ones of such aspects, the step of positioning the cap and the current collector plate in the assembled position may further include inserting the cap into the opening of the can and into contact with the current collector plate. Moreover, inserting the cap into the opening and into contact with the current collector plate may occur after inserting the electrode assembly with the current collector plate bonded thereto into the can.

5

6

Figure 11:
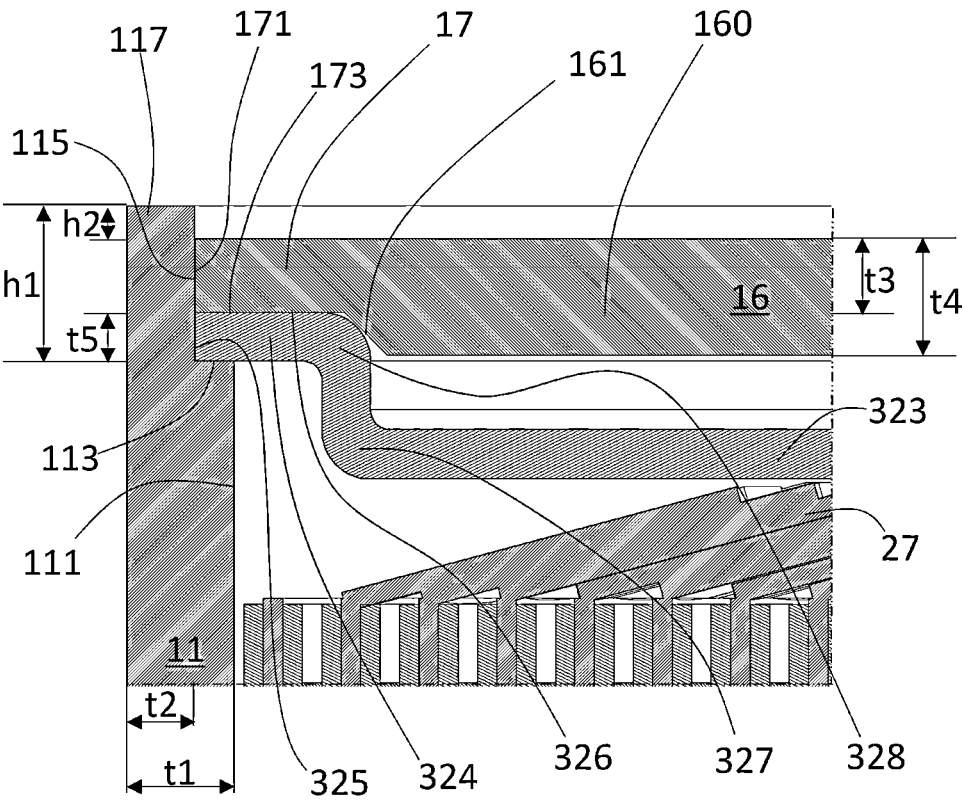
FIG. 11 is an enlarged view of a region of FIG. 10 where the sidewall member, the current collector plate, and the cap will be welded together.
Figure 13:
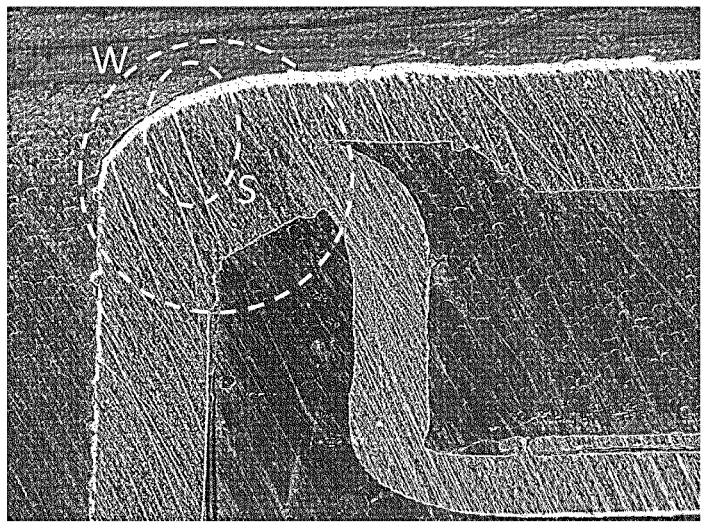

FIG. 13 is a photograph of a cut section of a battery cell corresponding to the region of FIG. 11 after welding was performed.

Figure 14:
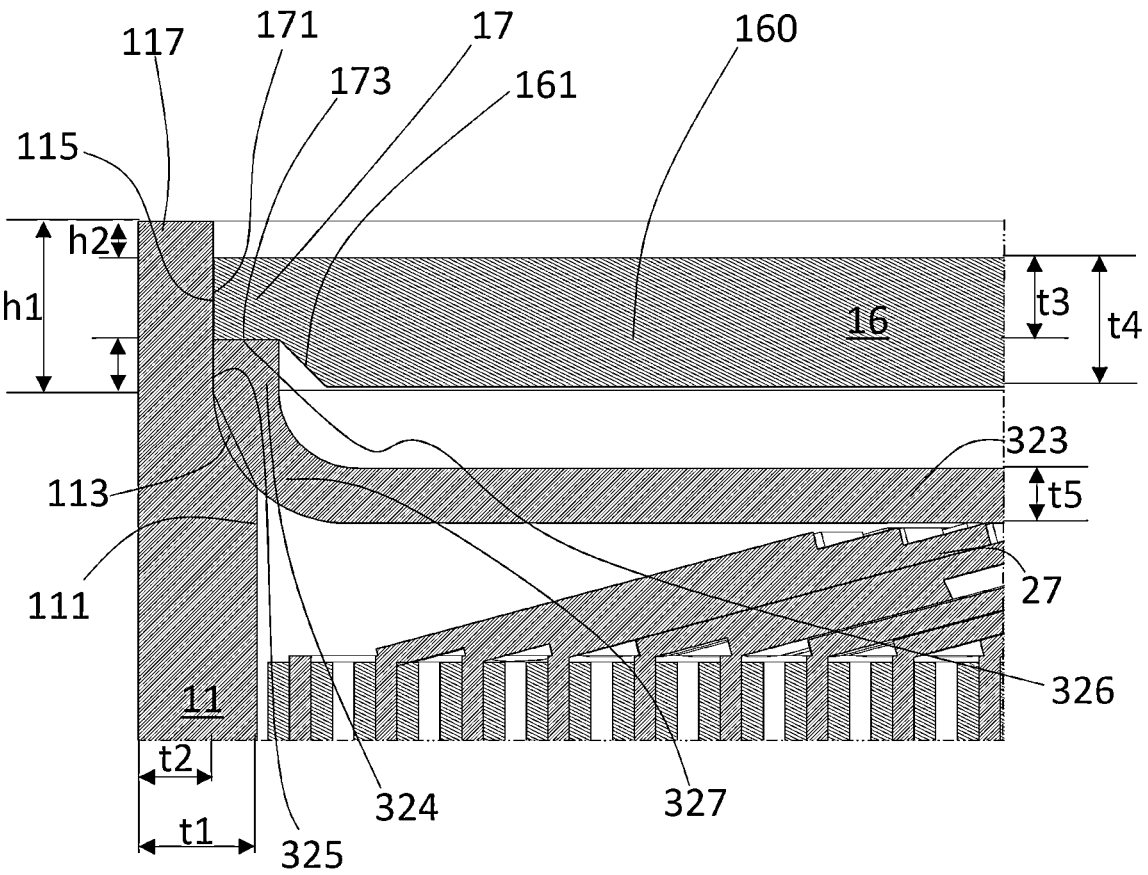

FIG. 14 is an enlarged view of the region illustrated in FIG. 11 of an alternative aspect of the disclosure.

Figure 15:
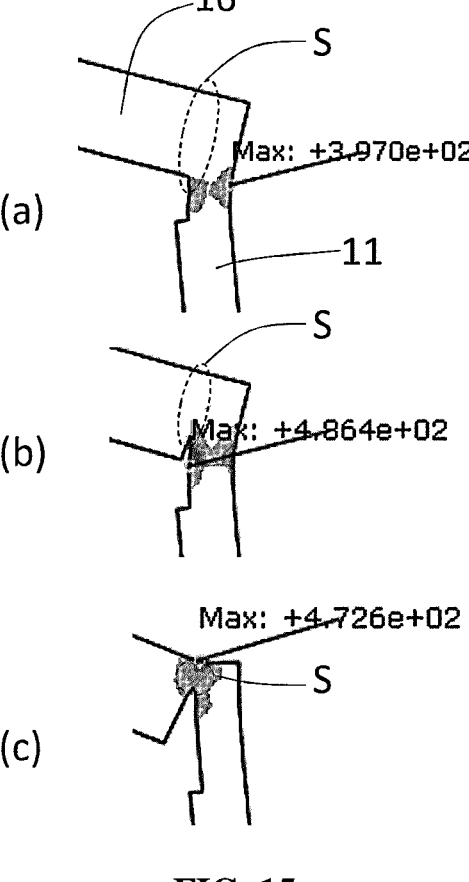

FIG. 15 is multiple diagrams illustrating the location and size of stress concentrations based on different lengths of weld along the outer circumferential bonding surface of the cap.

FIG. 16 is a flowchart illustrating a manufacturing process of a battery cell according to the present disclosure.

Figure 17:
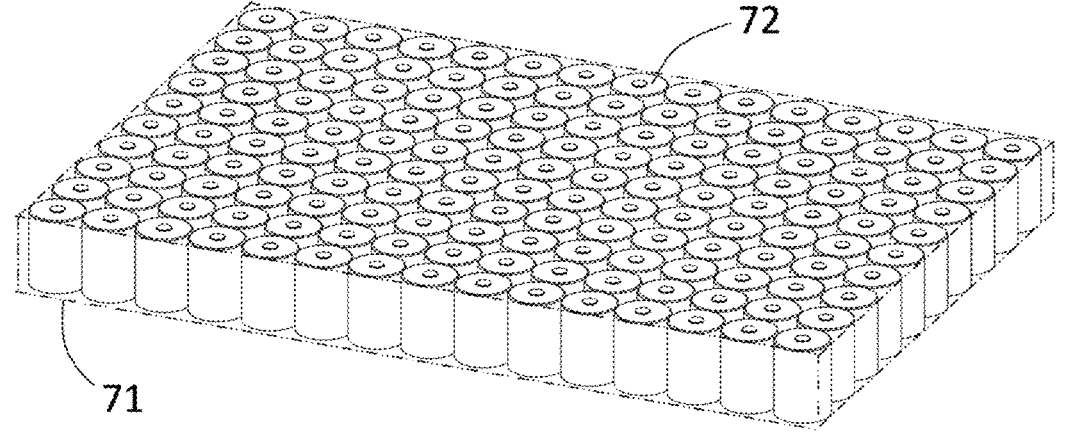

FIG. 17 is a perspective view of a battery pack including a plurality of battery cells according to aspects of the disclosure.

Figure 18:
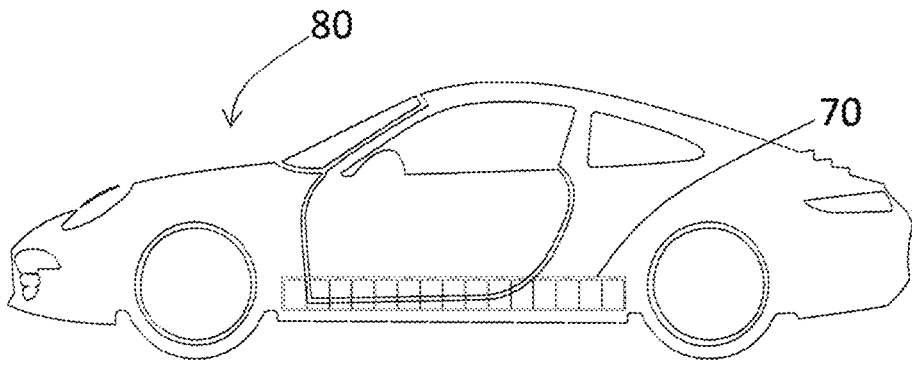

FIG. 18 is a diagram of a car equipped with the battery pack of FIG. 17.

DETAILED DESCRIPTION

The above-described objects, features and advantages will be described in detail hereinafter with reference to the accompanying drawings such that those skilled in the art will be able to implement the technical idea of the present disclosure. In describing the present disclosure, when it is determined that a detailed description of prior art related to the present disclosure unnecessarily obscures the gist of the present disclosure, the detailed description thereof will be omitted. Hereinafter, aspects of the present disclosure will be described in detail with reference to the accompanying drawings. In the drawings, identical reference numerals are used for indicating identical or similar components.

While "first", "second", etc. are used to describe various elements, these elements are not limited by these terms. Rather, such terms are only used to distinguish one element from another, and, unless specifically stated otherwise, a component identified as a first element may also be a second element, and vice versa.

Throughout the specification, unless stated otherwise, each element may be singular or plural.

Hereinafter, "arranging an element at an upper portion (or lower portion) of a component" or "arranging an element at a top (or bottom) of a component" refers not only to arranging the element so as to be in contact with an upper surface (or lower surface) of the component but also to arranging the element above the upper surface (or below the lower surface) with another element interposed therebetween.

Additionally, when an element is described as being "connected to," "coupled with," or "in contact with" a component, it should be understood that the element may be directly connected to, directly coupled with, or directly in contact with the component, or the element may be connected to, coupled with, or in contact with the component with one or more other elements interposed therebetween.

The expressions in singular form herein include expressions in plural form unless the context explicitly dictates otherwise.

Throughout the specification, "A and/or B" refers to A, B, or A and B unless specifically stated otherwise, and "C to D" is inclusive of both endpoints and all intervening values.

In the description of the embodiments, "axial direction" refers to the direction in which the central longitudinal axis constituting the winding center of the jelly-roll type electrode assembly extends, i.e., the direction parallel to the central longitudinal axis, whereas "radial direction" refers to a direction toward (centripetal) or away (centrifugal) from the axis, and "circumferential direction" refers to a direction surrounding the axis.

Hereinafter, an aspect of a battery cell to which a welding structure of the present disclosure is applied will be described in detail with reference to FIGS. 1 to 13.

A battery cell of this aspect of the disclosure may be, for example, a cylindrical battery cell whose form factor ratio (defined as the diameter of the cylindrical battery cell divided by the height, that is, the ratio of the diameter Φ to the height H) is greater than approximately 0.4.

The form factor refers to values representing the diameter and the height of a cylindrical battery cell. The cylindrical battery cell may be, for example, a 46110 cell, a 48750 cell, a 48110 cell, a 48800 cell or a 46800 cell. In the values representing the form factor, the first two numbers represent the diameter of the cell, the next two numbers represent the height of the cell, and the last number 0 represents that the cross-section of the cell is circular.

The battery cell may be a cell that is approximately cylindrical with a diameter of approximately 46 mm, a height of approximately 110 mm, and a form factor ratio of 0.418.

A battery cell according to another aspect may be a cell that is approximately cylindrical with a diameter of approximately 48 mm, a height of approximately 75 mm, and a form factor ratio of 0.640.

A battery cell according to yet another aspect may be a cell that is approximately cylindrical with a diameter of approximately 48 mm, a height of approximately 110 mm, and a form factor ratio of 0.418.

A battery cell according to yet another aspect may be a cell that is approximately cylindrical with a diameter of approximately 48 mm, a height of approximately 80 mm, and a form factor ratio of 0.600.

A battery cell according to another aspect may be a cell that is approximately cylindrical with a diameter of approximately 46 mm, a height of approximately 80 mm, and a form factor ratio of 0.575.

The present disclosure may be applied in the context of battery cells with a form factor ratio of approximately 0.4 or less, for example, 18650 cells, 21700 cells, etc. For an 18650 cell, its diameter is approximately 18 mm, its height is approximately 65 mm, and the form factor ratio is 0.277. For a 21700 cell, its diameter is approximately 21 mm, its height is approximately 70 mm, and the form factor ratio is 0.300.

The battery cell of the present disclosure includes an electrode assembly 20, current collector plates 31 and 32 electrically connected to the electrode assembly 20, and a can 10 accommodating the electrode assembly 20 and the current collector plates 31 and 32 therein.

The can 10 includes a bottom member 12, a sidewall member 11 connected to the bottom member 12 and extending in an axial direction, a cap 16 covering an open end provided at one axial end of the sidewall member 11.

The bottom member 12 may have a disk shape with a hole provided in the center thereof, and the sidewall member 11 may have a circular tubular shape that circumscribes an internal volume of the can 10.

The bottom member 12 and the sidewall member 11 may be manufactured by performing a deep drawing process on a metal sheet having a nickel-plated steel surface (although the material is not limited thereto), and then trimming the sidewall member 11 with a punch while holding the front end of the sidewall member with a blank holder.

A first electrode terminal 13 may be fitted into and coupled to the hole. The first electrode terminal 13 may be riveted and fixed to the bottom member 12 with a gasket 14 interposed therebetween. Specifically, the gasket 14 is interposed between the first electrode terminal 13 and the bottom member 12 to seal the inside and outside of the can 10, thereby preventing electrolyte leakage and electrically insulating the first electrode terminal 13 from the bottom member 12.

However, the connection method between the first electrode terminal 13 and the bottom member 12 is not limited thereto. For example, if the resulting structures are capable of creating a seal between the first electrode terminal 13 and the bottom member 12 and also electrically insulating the first electrode terminal 13 from the bottom member 12, then various other fixing methods may be used, such as a bolt-and-nut coupling method, a glass seal method, a chrome coating-and-PP-MAH (maleic anhydride grafted polypropylene or maleated polypropylene) heat bonding method.

The first electrode terminal 13 may have a first polarity, and the can 10 may have a second polarity. That is, the bottom member 12 of the can 10, the sidewall member 11 connected thereto, and the cap 16 (to be described later) connected to the sidewall member 11 may all have the second polarity.

Accordingly, the battery cell may have both the first electrode terminal 13 and the second electrode terminal 15 disposed at the axial end where the bottom member 12 is provided, that is, at the closed end of the can 10. As a result, the battery cell may have a busbar connected to the first electrode terminal 13 and another busbar connected to the second electrode terminal 15, with both busbars being located at the top of the battery cell.

In one example, the first electrode terminal 13 may be a cathode terminal and the second electrode terminal 15 may be an anode terminal, although they may be reversed in a different example.

Figure 1:
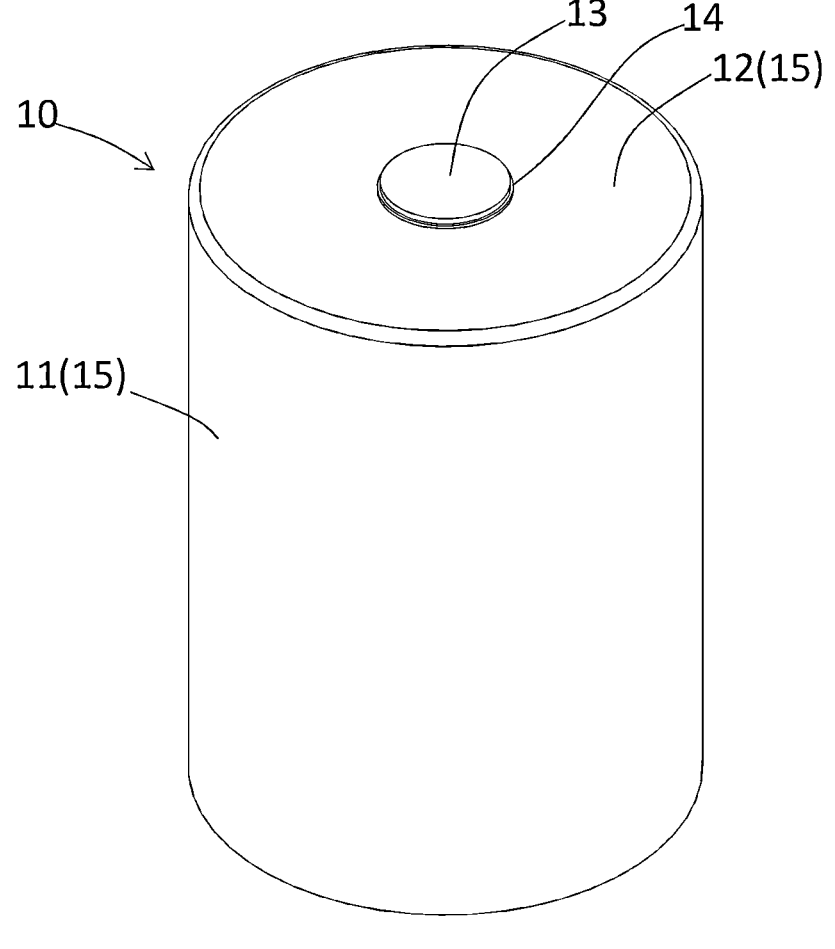
FIG. 1 is a perspective view of a cylindrical battery cell according to an aspect of the present disclosure.
Figures 2, 3:
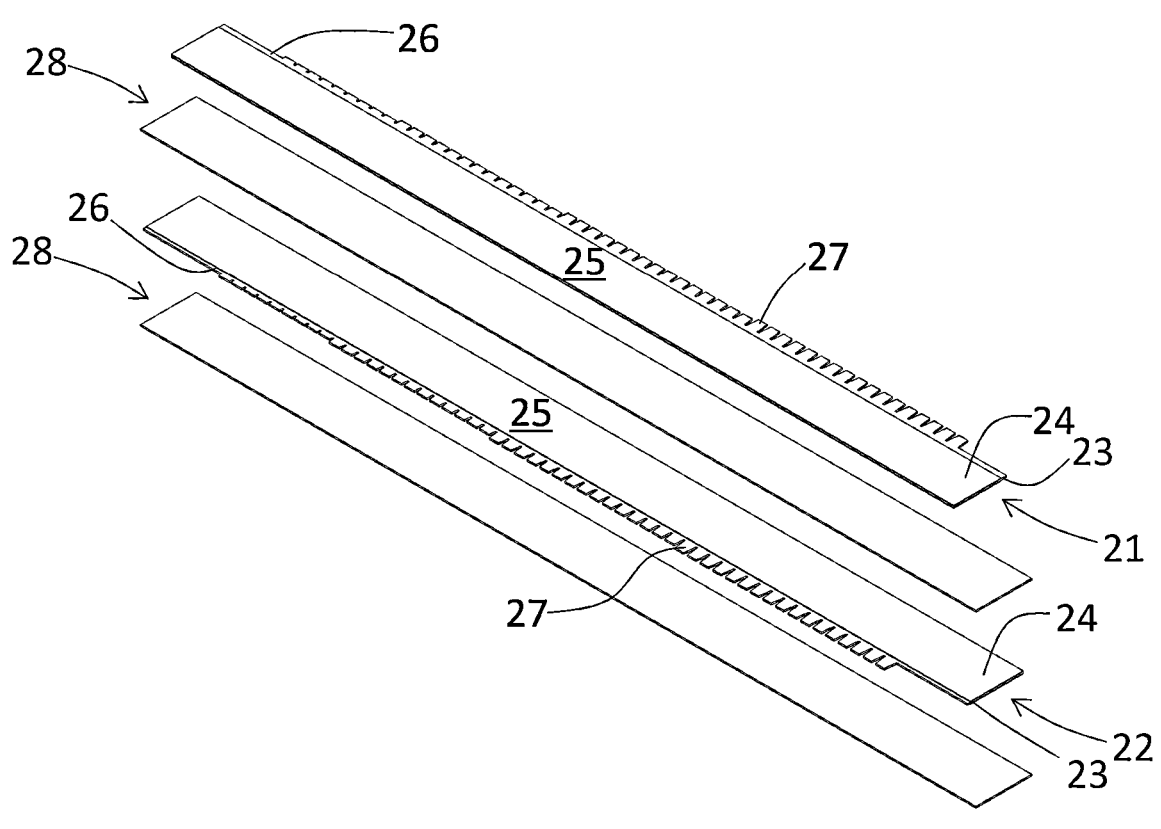
FIG. 2 is an exploded perspective view of the electrode assembly before it is wound and accommodated in the can of FIG. 1.
FIG. 3 is a perspective view of the electrode assembly of FIG. 2 in a laminated state before winding.
Figure 4:
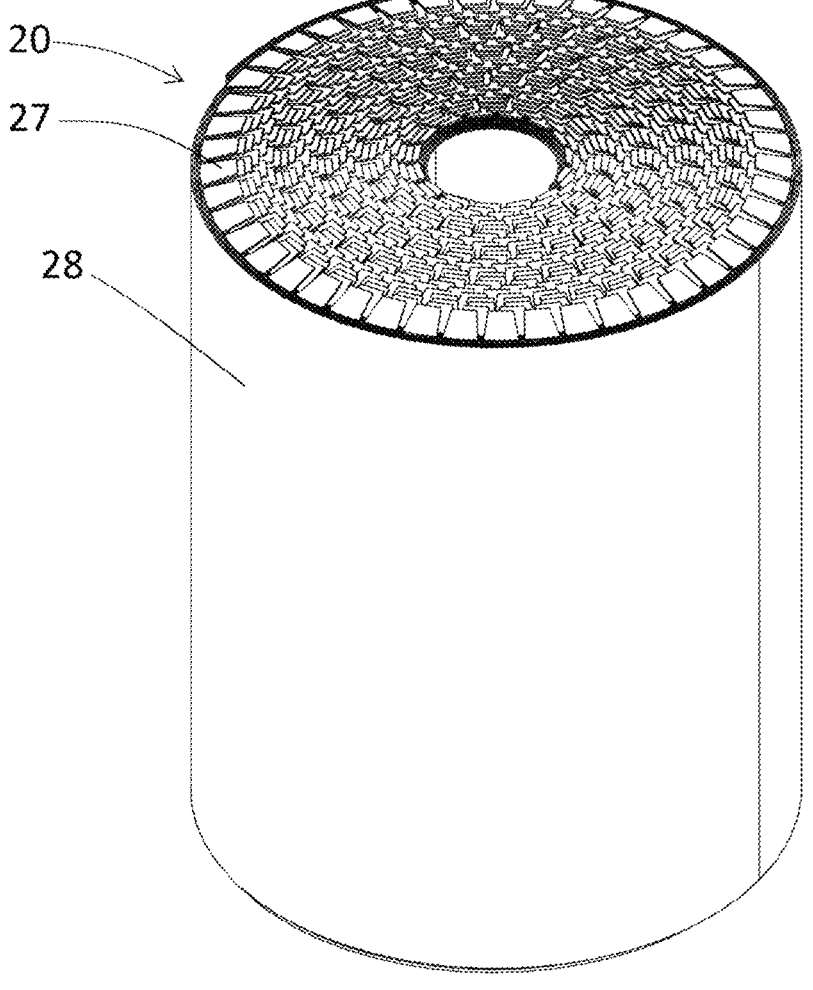
FIG. 4 is a perspective view of a cylindrical jelly-roll shaped electrode assembly assembled by winding the laminate of FIG. 3.

The electrode assembly 20 is received within the internal volume of the can 10. The electrode assembly 20 is manufactured by preparing a first electrode 21, a second electrode 22 and separators 28 extending in a lengthwise direction with a predetermined width as shown in FIG. 2, and then forming a laminate by sequentially stacking the first electrode 21, the separator 28, the second electrode 22, and the separator 28, as shown in FIG. 3, after which the laminate is coiled to have a shape of a jelly-roll wound around the core axis as shown in FIG. 4.

The first electrode 21 may be a cathode, and the second electrode 22 may be an anode. However, they may be reversed.

The first electrode 21 and the second electrode 22 are manufactured in the form of a sheet. The electrode sheet is manufactured by applying an active material layer 24 to the surface of a metal foil 23. The electrode sheet includes a coated area 25 where the active material layer 24 is applied and a non-coated area 26 where the active material layer 24 is not applied. The cathode sheet is provided with a non-coated area 26 on one side in the widthwise direction, and the anode sheet is provided with a non-coated area 26 on the other side in the widthwise direction.

The first electrode 21 and the second electrode 22 are arranged in the laminate such that their non-coated areas 26 are exposed or protruding from the laminate in the widthwise direction, with the non-coated area 26 of the first electrode 21 protruding at one axial end of the wound jelly-roll and the non-coated area 26 of the second electrode 22 protruding at the opposite axial end of the jelly-roll. The non-coated area 26 itself functions as at least one electrode tab 27.

Notches may be formed at predetermined intervals along the non-coated area 26 so as to define notched tabs 27.

The notched tabs 27 may each be shaped in the form of a flag. In the illustrated aspect, the notched tabs 27 have the shape of an equilateral trapezoid. However, the notched tabs 27 may have various shapes such as semicircular, semielliptical, triangular, rectangular, parallelogram, etc. Additionally, in the illustrated aspect, the notched tabs 27 each have the same width along the lengthwise direction of the electrodes. However, in another aspect, the width of the notched tabs along the lengthwise direction may gradually widen from the core side to the outer circumferential side.

In addition, as illustrated in FIGS. 2 and 3, the height of the notched tabs 27 gradually increases from the core side to the outer circumferential side. However, in alternative aspects, the height of the notched tabs may be constant or may gradually decrease.

In addition, according to this aspect, the notched tabs 27 may be removed or absent from the non-coated area 26 at both opposing ends of the first and second electrodes 21, 22 in the lengthwise direction. However, in some aspects, the notched tabs may not be removed from either end, or they may only be removed from the non-coated area at the radially inner end or the radially outer end when the electrode assembly 20 is wound into the jelly-roll configuration.

In the jelly-roll shaped electrode assembly 20, the notched tabs 27 may be bent in a radial direction and flattened, as shown in FIG. 4. That is, the notched tabs 27 may be bent inward or outward in the radial direction. Although, according to aspects of the disclosure, the notched tabs 27 are bent inward in the radial direction as illustrated.

The notched tabs 27 may be bent one by one in the process of winding the laminate to form the jelly-roll shaped electrode assembly 20. Alternatively, the notched tabs 27 may be formed by bending the same all at once after the laminate has been wound to form the jelly-roll shaped electrode assembly.

The notched tabs 27 of the first electrode 21 and the notched tabs 27 of the second electrode 22, which are bent and overlap with one another in the radial direction, may provide a plane substantially perpendicular to the axial direction at each of the opposing axial ends of the electrode assembly 20.

Figure 5:
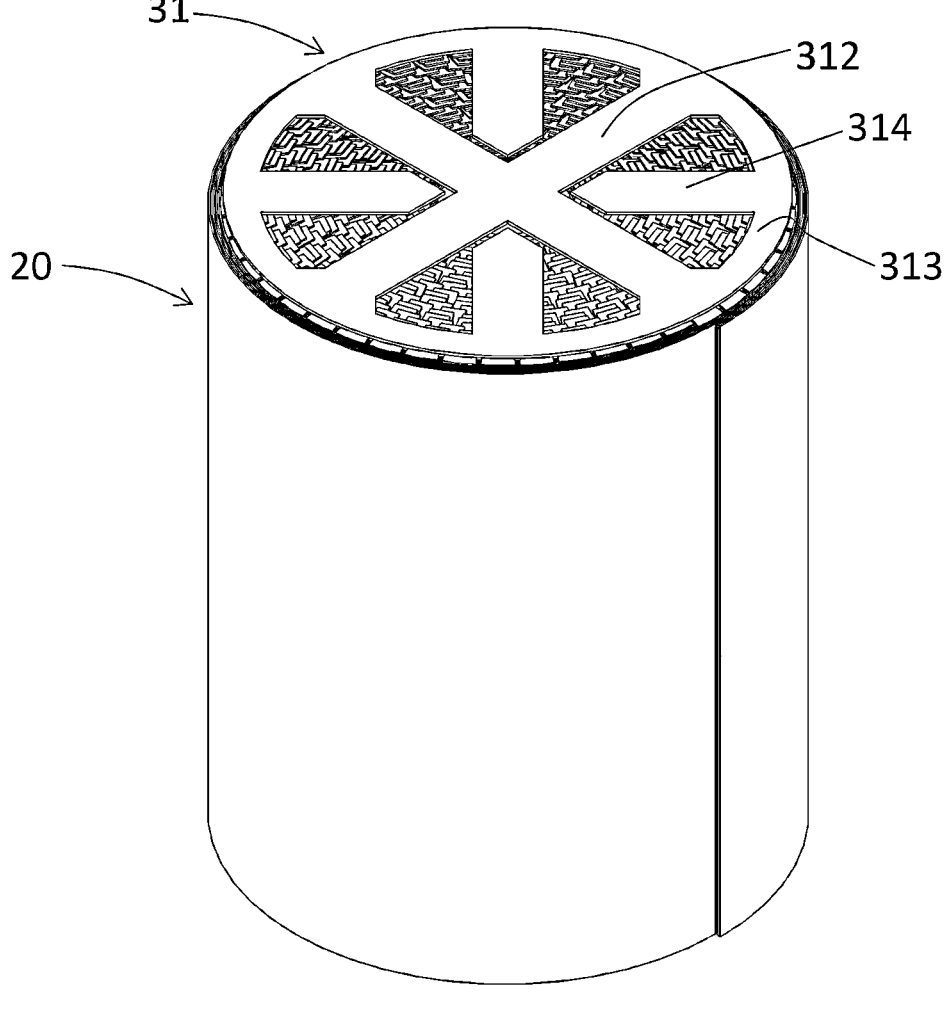
FIG. 5 is a perspective view illustrating a first current collector plate bonded to the electrode tabs of a first electrode of the electrode assembly of FIG. 4.
Figure 6:
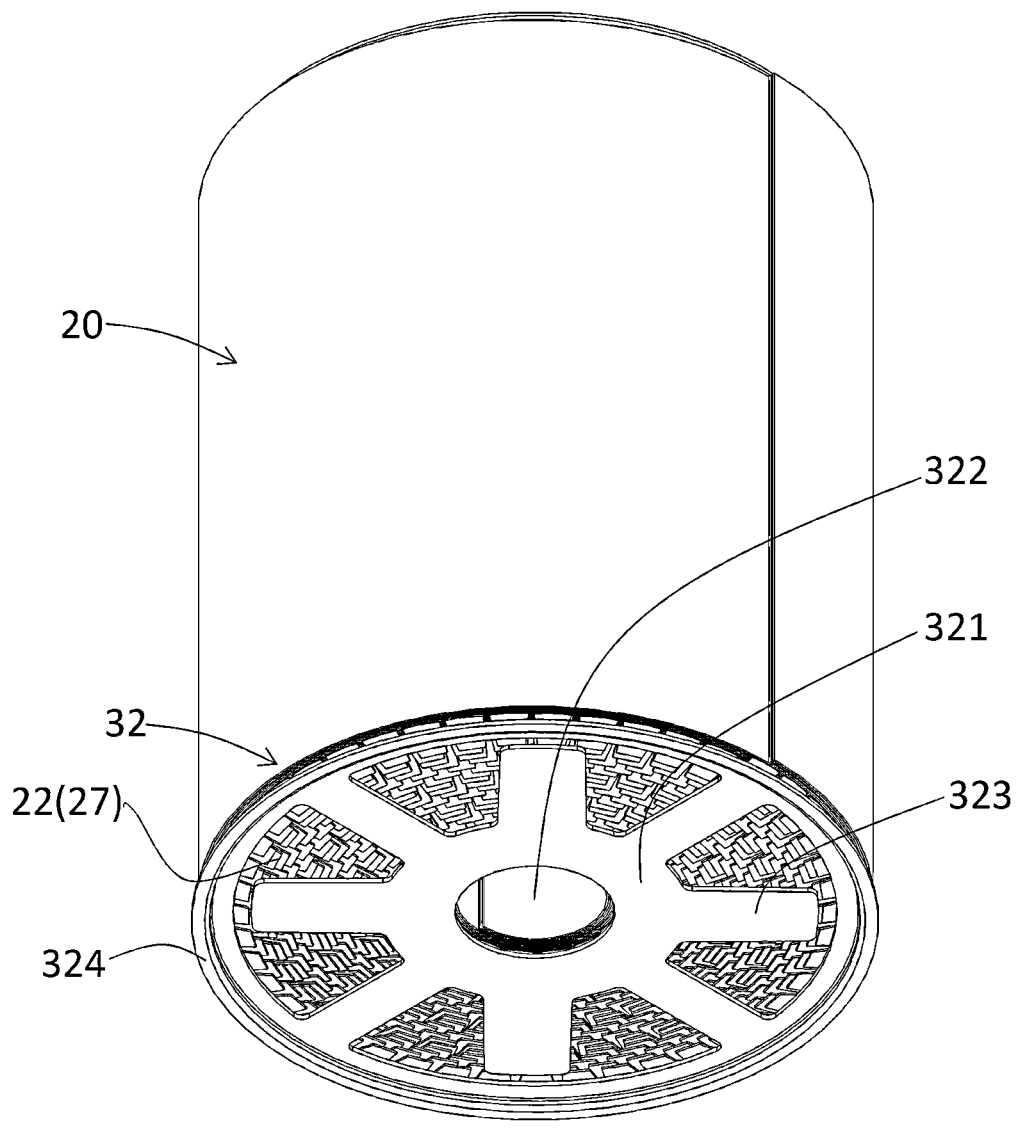
FIG. 6 is a perspective view illustrating a second current collector plate bonded to the electrode tabs of a second electrode of the electrode assembly of FIG. 4.

A first current collector plate 31 and a second current collector plate may be bonded to the substantially flat surface provided by the bent notched tabs 27 exposed at the two axial ends of the electrode assembly 20, as shown in FIGS. 5 and 6.

In one aspect, the first current collector plate 31 is a cathode current collector plate, and the second current collector plate 32 is an anode current collector plate. The first current collector plate 31 may be made of aluminum, and the second current collector plate 32 may be made of copper. The current collector plates 31 and 32 may be manufactured by punching, trimming, piercing, and/or bending a metal sheet.

Referring to FIG. 5, the first current collector plate 31 includes a terminal connecting part 312 extending from the center in the radial direction, a ring part 313 connecting the radially outer end of the terminal connecting part 312 and extending in the circumferential direction, and an electrode connecting part 314 extending radially inwardly from the ring part 313 without being connected to the terminal connecting part 312. The center of the terminal connecting part 312 covers at least a portion of the core hollow portion along the central longitudinal axis of the electrode assembly 20.

The electrode connecting part 314 is bonded to the notched tabs 27 of the first electrode 21 of the electrode assembly 20 using a method such as laser welding before the electrode assembly 20 is inserted into the can 10. The welding line of the laser may extend radially.

Referring to FIG. 6, the second current collector plate 32 defines a hole 322 corresponding to the core hollow portion of the electrode assembly 20. The second current collector plate 32 includes an inner ring part 321 surrounding the core hollow portion and an electrode tab connecting part 323 extending radially from the inner ring part 321. The electrode tab connecting part 323 may be in the form of a plurality of spokes extending radially outwardly from the inner ring part, where one or more of the spokes have radially outer ends connected to a peripheral portion of the current collector plate 32 referred to as a can connecting part 324. Moreover, one or more of the spokes of the electrode tab connecting part 323 may have radially outer ends that do not reach the can connecting part 324. The can connecting part 324 has an outer ring shape encircling the electrode tab connecting part 323, and the can connecting part 324 may include a step away from the electrode assembly 20 in the axial direction, such that at least an outermost periphery of the can connecting part 324 is spaced further away from the electrode assembly 20 than the other portions of the can connecting part 324, including the electrode tab connecting part 323 and the inner ring part 321.

The electrode tab connecting part 323 is bonded to the notched tabs 27 of the second electrode 22 of the electrode assembly 20 by laser welding, etc., before the electrode assembly 20 is inserted into the can 10. The welding line of the laser may extend radially.

Figure 7:
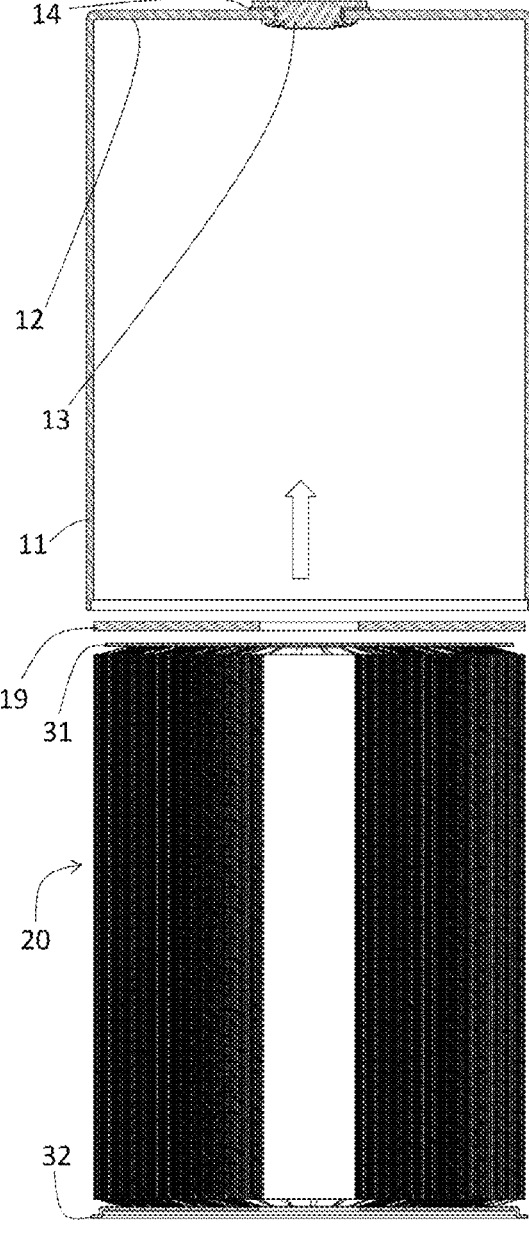
FIG. 7 is a side cross-sectional view illustrating a process of positioning into the can the electrode assembly to which the first and second current collector plates are bonded.
Figure 8:
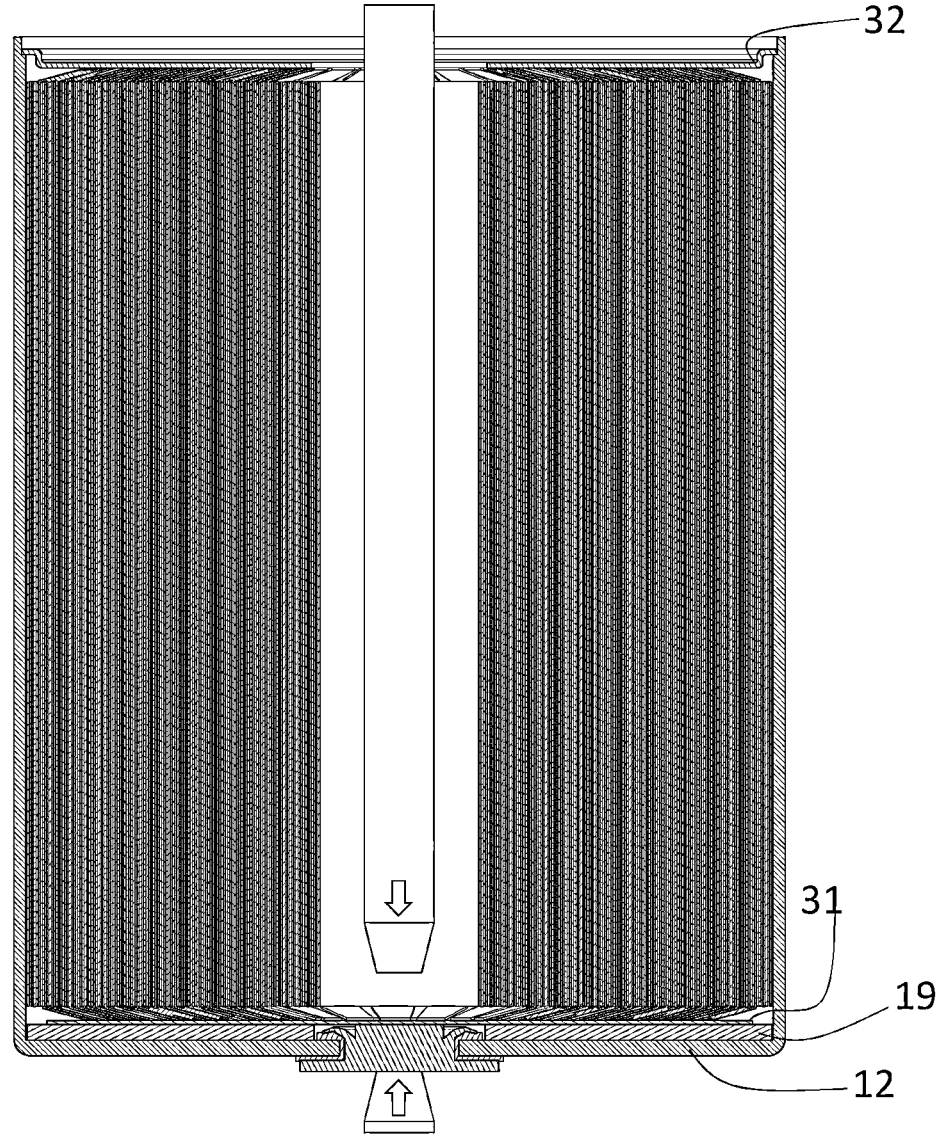
FIG. 8 is a side cross-sectional view illustrating a process of bonding the first current collector plate and a first electrode terminal of the electrode assembly accommodated in the can.

As shown in FIGS. 7 and 8, the electrode assembly 20 is accommodated in the can 10 with the first current collector plate 31 aligned to face the bottom member 12 of the can 10. An insulator 19 is interposed between the first current collector plate 31 and the bottom member 12 of the can 10 to electrically insulate the first current collector plate 31 from the bottom member 12.

The terminal connecting part 312 of the first current collector plate 31 is bonded to the first electrode terminal 13 by resistance welding, ultrasonic welding, laser welding, or the like. A welding device for welding the first current collector plate 31 and the first electrode terminal 13 may perform welding by accessing the inner side of the center of the terminal connecting part 312 of the first current collector plate 31 (i.e., the side of the terminal connecting part 312 facing the electrode assembly 20). Specifically, the welding device may access that location of the first current collector plate 31 from the open end of the can 10 through the core hollow part of the electrode assembly 20, as shown in FIG. 8. As an alternative to the above-described welding method, the first current collector plate 31 and the first electrode terminal 13 may be bonded to one another by brazing or soldering. That is, various bonding methods may be utilized, as long as the first current collector plate 31 and the first electrode terminal 13 are both fixed to and electrically connected to each other.

With the electrode assembly 20 accommodated inside the can 10, the electrode tabs 27 of the second electrode 22 and the second current collector plate 32 will be arranged to face the open end of the sidewall member 11.

Figure 9:
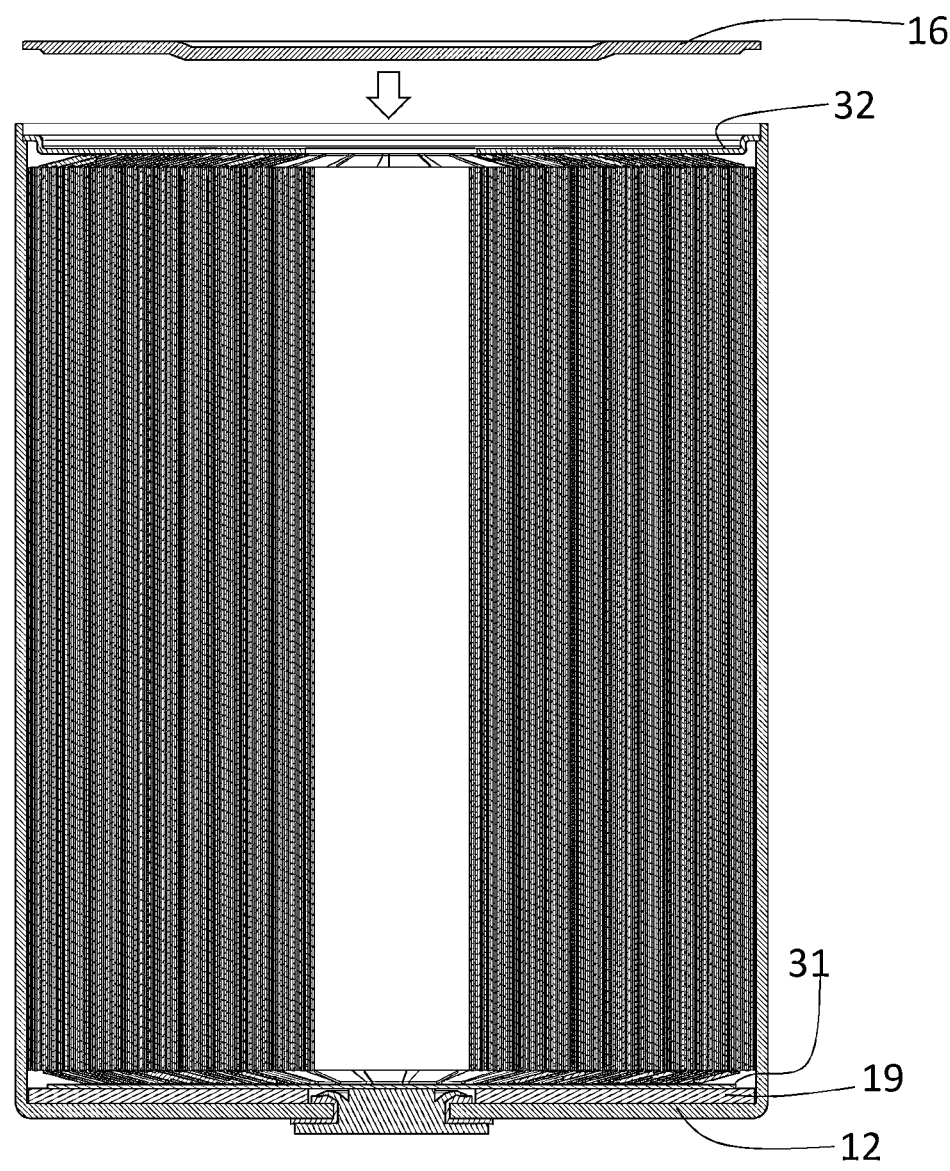
FIG. 9 is a side cross-sectional view illustrating a process of positioning a cap so as to cover the open end of the can that has the electrode assembly accommodated therein.

After the first current collector plate 31 and the first electrode terminal 13 are bonded, the electrolyte solution may be injected into the can 10. After injecting the electrolyte solution, the open end of the sidewall member 11 may be covered and closed with a cap 16, as shown in FIG. 9.

The welding methodology of the present disclosure can also be utilized in connection with a method in which the cap 16 is first positioned so as to cover and close the open end of the sidewall member 11, after which the electrolyte solution can be injected through a liquid injection port of the cap 16, which port is subsequently closed.

Figure 10:
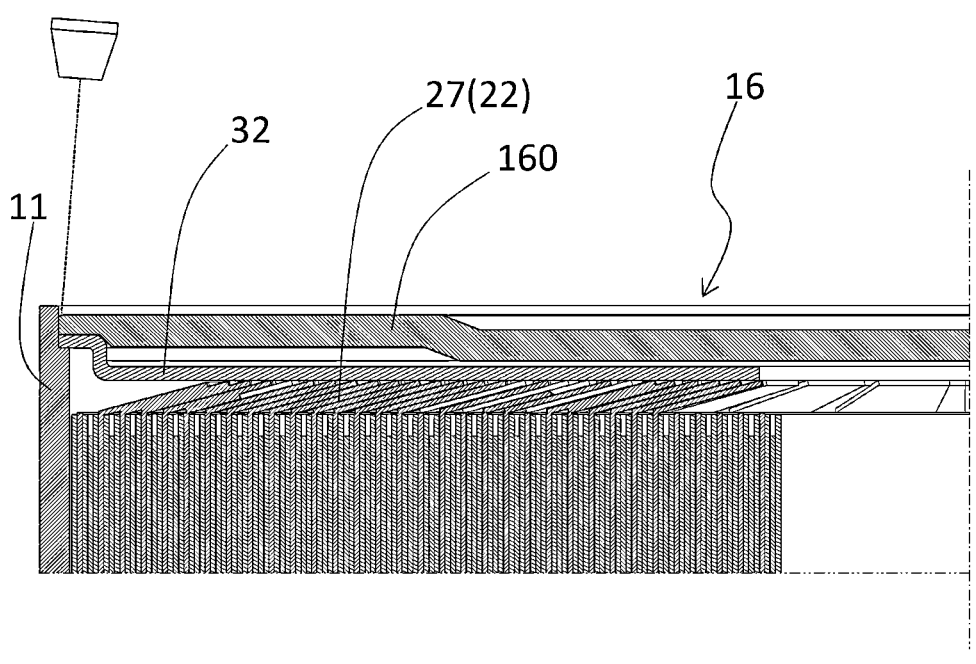
FIG. 10 is an enlarged side cross-sectional view of the open end of the can covered with the cap.

As shown in FIG. 10, the edge of the cap 16 is bonded to the edge of the sidewall member 11 by seam welding with a laser, so that the can 10 may thus be sealed.

Referring to FIGS. 10 and 11, an inner diameter expansion part 113 may be provided at the open end of the sidewall member 11. The inner diameter expansion part 113 may be in the form of a lateral step extending transverse to the central longitudinal axis and positioned along the radially inner surface of the sidewall member 11. Accordingly, the radially inner surface of the sidewall member 11 may include a first inner surface 111 positioned axially below (i.e., further from the opening at the open end of the sidewall member 11 than) the inner diameter expansion part 113, and a second inner surface 115 positioned axially above (i.e., closer to the opening at the open end of the sidewall member 11 than) the inner diameter expansion part 113. The second inner surface 115 may have a larger inner diameter than the first inner surface 111. Accordingly, a second thickness t2 of the sidewall member 11 measured in the radial direction at a portion where the second inner surface 115 is located is smaller than a first thickness t1 of the sidewall member 11 at a portion where the first inner surface 111 is located.

The can connecting part 324 provided at the edge of the second current collector plate 32 and electrically connected to the can 10 includes a first portion in contact with the second inner surface 115 of the sidewall member 11. In the first portion, an outer circumferential contact surface 325 is provided that faces and is in contact with the second inner surface 115 of the sidewall member 11 in the radial direction.

The can connecting part 324 includes a second portion in contact with the cap 16. In the second portion, a cap contact surface 326 is provided that faces and is in contact with the inner surface of the cap 16 in the axial direction, i.e., the underside of the cap 16.

The outer diameter of the outer circumferential contact surface 325 of the can connecting part 324 is set to be larger than the inner diameter of the first inner surface 111. Accordingly, the can connecting part 324 includes a third portion in contact with the inner diameter expansion part 113. The third portion is positioned on the opposite side of the cap contact surface 326 in the axial direction. The third portion is in contact with the inner diameter expansion part 113 and thereby constrains the insertion depth of the second current collector plate 32 into the can 10.

The second current collector plate 32 further includes a first bent part 327 and a second bent part 328 thus defining a step in the axial direction. The first bent part 327 is where the second current collector plate 32 extending outward in the radial direction is bent upward in the axial direction. The second bent part 328 is where that upwardly bent portion of the second current collector plate 32 is bent back outward in the radial direction. As a result of that axial step between the first bent part 327 and the second bent part 328, the peripheral portion (or can connecting part 324) of the current collector plate 32 is offset in the axial direction towards the open end of the can 10 relative to a central portion of the current collector plate 32. The can connecting part 324 is connected to the electrode tab connecting part 323 through the first bent part 327 and the second bent part 328, and through the inner ring part 321 described above. The can connecting part 324 is connected to the radially outer side of the second bent part 328 and extends from the second bent part 328 outwardly in the radial direction, thus providing the cap contact surface 326 of the second current collector plate 32.

The material of the second current collector plate 32 is desirably softer than that of the sidewall member 11, and therefore the first bent part 327 and the second bent part 328 are elastically deformed in the process of inserting the second current collector plate 32 into the open end of the sidewall member 11. Accordingly, the outer circumferential contact surface 325 is press-fitted into the second inner surface 115 when the outer diameter of the outer circumferential contact surface 325 is set to be slightly larger than the inner diameter of the second inner surface 115.

The cap 16 includes, sequentially from the center towards the outer side in the radial direction: a cap body 160, a thickness reduction part 161 (where the thickness of the cap changes), and a bonding portion 17. That is, the cap body 160 is centered in a central region of the cap 16 and the thickness reduction part 161 is provided around the outer side of the cap body 160 in the radial direction. The bonding portion 17 is positioned along a radially outer side of the thickness reduction part 161 so as to define an annular region of the cap 16 having a reduced thickness relative to the cap body 160. That is, a third thickness t3 of the bonding portion 17 measured in the axial direction is smaller than a fourth thickness t4 of the cap body 160 measured in the axial direction.

An outer circumferential bonding surface 171 that faces the second inner surface 115 of the sidewall member 11 in the radial direction is provided along a radially outer surface of the cap 16, and specifically along the radially outer surface of the bonding portion 17. In addition, the underside of the cap 16 along the bonding portion 17 includes a current collector plate contact surface 173 facing downwardly in the axial direction so as to contact the cap contact surface 326 of the can connecting part 324 of the second current collector plate 32.

The location of the thickness reduction part 161 is selected such that at least a portion of the thickness reduction part 161 contacts the second current collector plate 32. Such contact beneficially achieves the effect of aligning the center of the cap 16 with respect to the second current collector plate 32 and the central longitudinal axis as the thickness reduction part 161 of the cap 16 comes in contact with the second current collector plate 32 in the process of inserting the cap 16 into the open end of the sidewall member 11. In the illustrated aspect, the alignment effect can be achieved by placing the thickness reduction part 161 at a position corresponding to the position where the second bent part 328 of the second current collector plate 32 is formed in the radial direction. In order to increase the alignment effect, the thickness reduction part 161 desirably has the form of an inclined surface extending upward in the axial direction as approaches the outer side in the radial direction. In addition, in order to increase the alignment effect, an inclined surface is desirably provided on the second current collector plate 32 by means of the surface shape of the second bent part 328 of the second current collector plate 32.

The outer circumferential bonding surface 171 of the cap 16 and the outer circumferential contact surface 325 of the second current collector plate 32 are each in contact with the second inner surface 115 of the sidewall member 11 in the radial direction. In addition, in the axial direction, at least a portion of the underside of the second current collector plate 32 along its peripheral portion is in contact with the inner diameter expansion part 113 of the sidewall member 11. The cap contact surface 326 provided on the upper side of the second current collector plate 32 is in contact with the current collector plate contact surface 173 provided on the underside of the bonding portion 17 of the cap 16.

With the second current collector plate 32 and the cap 16 inserted, an overhang part 117 in the form of an extension of the sidewall member 11 at the open end that projects upward in the axial direction above the cap 16 may be provided.

As illustrated in FIG. 11, a first height h1 of the region extending axially upward from the inner diameter expansion part 113 is greater than the sum of the third thickness t3 of the bonding portion 17 of the cap 16 and the fifth thickness t5 of the can connecting part 324 of the second current collector plate 32. That is, the second height h2 of the overhang part 117 may be the length obtained by subtracting the third thickness t3 and the fifth thickness t5 from the first height h1. In one example, the first height h1 may be 1 mm, the second height h2 may be 0.2 mm, the third thickness may be 0.5 mm, and the fifth thickness t5 may be 0.3 mm.

A welding portion W is formed along the contact area between the sidewall member 11, the second current collector plate 32, and the cap 16, specifically where the second inner surface 115 of the sidewall member 11, the outer circumferential bonding surface 171 of the cap 16, and the can connecting part 324 of the second current collector plate 32 are welded together.

The welding portion W may be formed substantially or entirely along about the cap 16 in the circumferential direction. Accordingly, the welding portion W may also function as a sealing part S that seals the contact area between the can 10 and the cap 16.

However, in another aspect, the welding portion W may be formed only in discrete portions spaced apart from one another in the circumferential direction. For example, the welding portion W may only constitute a portion of the sealing part S that seals the contact area between the can 10 and the cap 16.

The welding portion W may be formed by a laser that is irradiated to weld the contact area between the can 10 and the cap 16 along the circumferential direction, as well as the contact area between the can connecting part 324 of the second current collector plate 32 and the can 10.

The sealing part S may also be formed by laser welding that is continuously irradiated onto the contact area of the can 10 and the cap 16 along the circumferential direction.

The welding portion W may be formed in a preliminary welding process or in a subsequent, main welding process. The sealing part S may be formed in the main welding process. In some aspects, the welding portion W and the sealing part S may be formed together in the main welding process.

The illustrated aspect exemplifies a structure wherein the contact area between the can 10 and the cap 16 and the contact area between the can 10 and the second current collector plate 32 are welded together in a main welding process by continuous irradiation with a laser along the circumferential direction while keeping the energy density and the scanning speed of the laser constant. The result forms both the welding portion W and the sealing part S along the entirety of the sidewall member 11 in the circumferential direction.

However, in contrast, an alternative aspect may involve the contact area of the can 10 and cap 16 being continuously irradiated with a laser along the circumferential direction as part of the main welding process. Moreover, during that process, the can connecting part 324 of the second current collector plate 32 may also be welded to the can 10 by increasing the energy density of the laser or reducing the scanning speed only in certain discrete portions along the circumferential direction, such that the laser penetrates further down to form the welding portion W along such discrete portions, while the sealing part S is formed at least substantially along the entirety of the sidewall member in the circumferential direction. The resulting discrete portions in which the welding portion W is formed between the second current collector plate 32 and the can 10 is similar to 'tack welding' that secures those two components together, whereas the continuous sealing part S forms a seal along substantially the entire externally-exposed contact area between the can 10 and the cap 16. Indeed, similar to tack welding, the welding method may involve first forming a plurality of the discrete welding portions W between the second current collector plate 32 and the can 10 and between the cap 16 and the can 10 (e.g., by using slower speed and/or higher energy laser irradiation at discrete locations along the circumferential direction), after which the laser irradiation can be performed continuously along the entire exposed connection between the can 10 and the cap 16. Beneficially, that approach may utilize the discrete welds to at least temporarily fix the position of the second current collector plate 32 and the cap 16 with respect to the can 10 while the subsequent process of sealing by forming continuous sealing part S is performed.

As shown, the upper axial ends of the outer circumferential bonding surface 171 of the cap 16 and the radially inner surface of the sidewall member 11, which are in contact with each other in the radial direction, are exposed along the outside of the battery cell.

The welding portion W is formed by a laser irradiated from outside of the battery cell in the axial direction and oriented toward the axial ends of the outer circumferential bonding surface 171 of the cap 16 and the second inner surface 115 of the sidewall member 11.

Since the outer circumferential contact surface 325 of the second current collector plate 32 is disposed axially below the cap 16 and is in contact with the radially inner surface of the sidewall member 11, it is possible to prevent the laser from irradiated into the internal volume of the can through any gap that might be present between the sidewall member 11 and the cap 16. In addition, the inner diameter expansion part 113 of the sidewall member 11 also prevents the laser from irradiating and penetrating through a gap between the sidewall member 11 and the cap 16 or between the sidewall member 11 and the second current collector plate 32.

The second current collector plate 32 may be made of a material with higher thermal conductivity than the sidewall member 11. Moreover, the second current collector plate 32 is in contact with the sidewall member 11. Therefore, when the welding heat generated in the sidewall member 11 by the laser is conducted along the axial direction of the sidewall member 11, the welding heat is dispersed to and across the top of the electrode assembly 20 through the second current collector plate 32, such that damage to the separator caused by the welding heat may be prevented.

The second current collector plate 32 is also in contact with the cap 16. Accordingly, the heat generated in the cap 16 by laser welding is dispersed and transferred through the second current collector plate 32. As a result, the sidewall member 11 may be heated first and then melted when the contact area between the cap 16 and the sidewall member 11 is heated with laser.

Therefore, when the sidewall member 11 is too thin, the sidewall member 11 may melt before the cap 16, and welding may not be performed smoothly. Accordingly, the second thickness t2 of the sidewall member 11 is preferably 0.25 mm or more. For example, the second thickness t2 may be 0.35 mm.

It is also important that the cap 16 has sufficient strength to endure anticipated increases in the inner pressure within the can 10. When the cap 16 is too thin, too much bulging may occur, in which the cap 16 swells into a spherical surface profile under high internal pressure within the can 10, thereby deteriorating the durability of the battery cell. In order to resist such bulging deformation, it is important for the cap 16 to have a certain thickness. On the other hand, when the thickness of the cap 16 is too thick relative to the sidewall member 11, only the sidewall member 11 may initially melt during laser welding, thereby greatly impairing the welding process. Additionally, as the thickness of the cap 16 increases, the axial length of the outer circumferential bonding surface 171 of the cap 16 where welding may be performed also increases.

FIG. 15 shows the results of stress analysis when the internal pressure within the can 10 increases for three cases. Specifically, case (a) involves the outer circumferential bonding surface 171 of the cap 16 being welded along the entirety of the outer circumferential bonding surface 171 of the cap 16 along the axial direction, so as to form a sealing part S and/or a welding portion W. In case (b), the outer circumferential bonding surface 171 of the cap 16 is welded along the top 75% of its axial direction to form a sealing part S and/or welding portion W. Finally, in case (c), the outer circumferential bonding surface 171 of the cap 16 is welded along the top 25% of the axial direction to form a sealing part S and/or welding portion W. Referring to FIG. 15, it may be confirmed that a weak portion exists in the welding area of the sidewall member 11 and the cap 16 when the outer circumferential bonding surface 171 of the cap 16 is not welded along the entirety of its axial direction.

The illustrated aspect involves a structure in which the third thickness t3 of the bonding portion 17 that is welded to the sidewall member 11 is different from the fourth thickness t4 of the cap body 160. The thicker the fourth thickness t4, the higher the resistance against bulging, but the inner space of the can it occupies also increases. To increase resistance against bulging while minimizing space occupancy and weight, the fourth thickness t4 is preferably as small as possible within a range of required bulging resistance.

As a result, the fourth thickness t4 of the cap body 160, which occupies the majority of the cap 16, is desirably larger than the third thickness t3 so as to minimize deformation of the cap 16 due to internal pressure within the can 10, while also minimizing the thickness of the welding portion along the axial dimension so as to ensure that the sealing part S and/or the welding portion W is formed along the entire axial dimension of the outer circumferential bonding surface 171, thereby increasing the strength of the cap 16 itself and also the bonding strength of the cap 16 to the sidewall member 11. The ratio of the third thickness t3 to the fourth thickness t4 is preferably 0.4 to 0.8, and more preferably 0.5 to 0.75. When the ratio is less than the range, the cap body 160 becomes excessively thick without increasing bulging resistance and/or strength of the welding portion becomes insufficient. When the ratio is more than the range, the bulging resistance of the cap body 160 becomes insufficient and/or it becomes difficult for the outer circumferential bonding surface 171 of the cap 16 to be welded along the entirety of its axial direction.

According to the illustrated aspect, the thickness reduction part 161 may be positioned in the radial direction as close to the welding area as possible, such that a maximal area of the cap body 160 that resists bulging may be obtained. In addition, by selecting the position of the thickness reduction part 161, a guide function for aligning the center of the cap 16 while being in contact with the second current collector plate 32 may also be provided.

The third thickness t3 of the bonding portion 17 of the cap 16 may be set to be larger than the second thickness t2 of the sidewall member 11. The third thickness t3 may be between one and two times the second thickness t2. For example, where the second thickness t2 is 0.35 mm, the third thickness t3 may be 0.5 mm or in a range from 0.5 mm to 0.7 mm.

When the third thickness t3 is more than twice the second thickness t2, there is a risk that the sidewall member 11 may be excessively melted before the cap 16 is melted during the process of forming the sealing part and/or the welding portion. In addition, when the third thickness t3 is more than twice the second thickness t2, there is a risk that the sealing part and/or the welding portion will not be formed along the entirety of the outer circumferential bonding surface 171 of the cap 16 in the axial direction.

When the third thickness t3 is less than the second thickness t2, that is, when the second thickness t2 is greater than the third thickness t3, it may be difficult to ensure the strength of the edge area of the cap 16. It may also be difficult to provide a sufficient lateral step dimension of the inner diameter expansion part 113 of the sidewall member 11 without making the overall thickness t1 of the sidewall member 11 excessively large.

The overhang part 117 may reduce the difference in melting time between the sidewall member 11 and the cap 16 by delaying the melting time of the relatively thin sidewall member 11. Moreover, during the welding process, the overhang part 117 may desirably melt and flow into the welding area between the radially inner surface of the sidewall member 11 and the outer circumferential bonding surface 171 of the cap 16 In that regard, the diameter of the outer circumferential bonding surface 171 of the cap 16 may be slightly smaller than a diameter of the second inner surface 115 of the sidewall member 11 that is adjacent to the outer circumferential bonding surface 171. In this context, two objects are 'adjacent' when they are spaced close together relative to their outer dimensions, and, within the relevant plane (i.e., the radial plane that is orthogonal to the central longitudinal axis), there are no separate intervening objects between the two. The slightly smaller diameter of the outer circumferential bonding surface 171 of the cap 16 relative to the diameter of the second inner surface 115 of the sidewall member 11 results in a small gap is defined between those two components. Such gap may serve as a path through which the laser for welding may directly irradiate the second current collector plate 32. Such gap desirably has an even width in the radial direction along the entire circumferential direction of the cap 16, at least due to the centering of the cap 16 by means of the interaction between the thickness reduction part 161 of the cap 16 and the second current collector plate 32, as discussed above. Moreover, during the welding process, the material of the overhang part 117 desirably flows into the gap between the outer circumferential bonding surface 171 of the cap 16 and the second inner surface 115 of the sidewall member 11 so as to join the cap 16 and the sidewall member 11 together. In one exemplary aspect, the height h2 of the overhang part 117 is 0.2 mm while the thickness t3 of the bonding portion 17 of the cap 16 is 0.5 mm. When the thickness t2 of the overhang part 117 is 0.35 mm, it may provide sufficient material when melted upon welding so as to create a strong joint between the cap 16 and the sidewall member 11. For example, a ratio of overhang height h2 to bonding portion 17 thickness t3 may desirably be in a range from 0.2 to 1.

Figure 12:
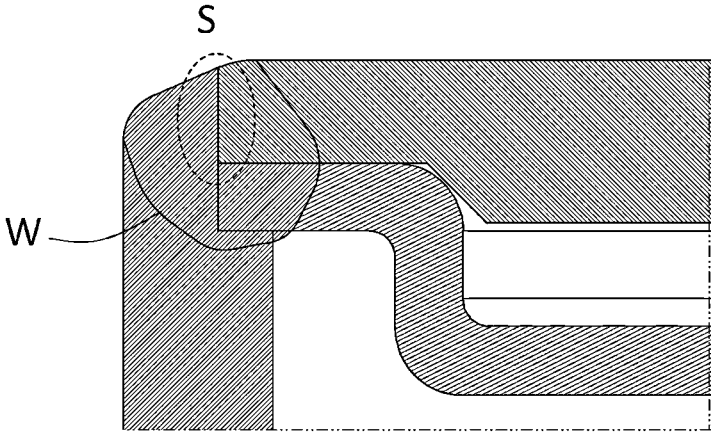
FIG. 12 is a diagram illustrating the region of FIG. 11 after welding has been performed.

The overhang part 117 of FIG. 11 may be melted as shown in FIGS. 12 and 13 in the process of forming the sealing part S and/or the welding portion W. As a result, the final overall height of the battery cell may be defined by the outer surface of the cap 16. That is, as shown in the illustrated aspect, the sealing part S and/or the welding portion W do not contribute to the height of the battery cell, such that the height dimension of the battery cell may be managed consistently.

Hereinafter, with reference to FIG. 14, an alternative aspect of the welding structure according to the present disclosure will be described. In such description, the differences from the previous aspects will be mainly described in order to avoid redundant descriptions. Therefore, it is to be understood that matters not the described in connection with aspects of FIG. 14 may be fully understood in view of the descriptions of the other aspects. Moreover, it is to be understood that each element of the previous aspects described above and the alternative aspect of FIG. 14 described hereinafter may be substituted for one another or omitted, as long as there is no conflict with the spirit of the disclosure.

The sidewall member 11 includes an inner diameter expansion part 113 at the open end of the sidewall member 11. The inner diameter expansion part 113 has an inclined or oblique surface provided on the radially inner surface of the sidewall member 11 to expand the inner diameter of the sidewall member 11 proximate the upper axial end of the sidewall member 11 at the open end. That is, the inner diameter expansion part 113 is provided along the inner surface of the sidewall member 11 and has an inclined surface that is oriented obliquely relative to the central longitudinal axis, such that the surface extends further outward in the radial direction as approaches the upper axial end of the sidewall member 11.

The second current collector plate 32 includes a first bent part 327, which is where the second current collector plate 32 extending outward in the radial direction is bent upward so as to extend along the axial direction. Accordingly, the peripheral portion (i.e., the can connecting part 324) of the second current collector plate extends along the axial direction, rather than extending in a radial direction as in some prior aspects. As a result, the outer circumferential contact surface 325 that contacts the second inner surface 115 of the sidewall member 11 extends along the longitudinal dimension of the peripheral portion, rather than being defined by the terminal end of the peripheral portion. Instead, the terminal end of the peripheral portion in aspects of FIG. 14 is the cap contact surface 326 that abuts the current collector plate contact surface 173 on the underside of the cap 16 along the bonding portion 17.

The can connecting part 324 of the second current collector plate 32 is connected to the electrode tab connecting part 323 through the first bent part 327 and the inner ring part 321 as described above.

Since the material of the second current collector plate 32 is softer than that of the sidewall member 11, the first bent part 327 is elastically deformed in the process of inserting the second current collector plate 32 into the open end of the sidewall member 11. Accordingly, the outer circumferential contact surface 325 is press-fitted into the second inner surface 115 when the outer diameter of the outer circumferential contact surface 325 is set to be slightly larger than the inner diameter of the second inner surface 115 such that the outer circumferential contact surface 325 is brought into close contact with the second inner surface 115 in the radial direction.

Dimensionally, the outer circumferential surface portion of the first bent part 327 of the second current collector plate 32 partially overlaps with the inner diameter expansion part 113 of the sidewall member 11. Accordingly, even when a tolerance occurs in the dimensions of the second current collector plate 32 or the dimensions of the sidewall member 11, the outer circumferential surface of the second current collector plate 32 will be in strong contact with the radially inner surface of the sidewall member 11.

According to the structure of the second current collector plate 32 of aspects of FIG. 14, the cap contact surface 326 provided at the axially outer end of the can connecting part 324 of the second current collector plate 32 has a width in the radial dimension that corresponds to approximately the fifth thickness t5 of the second current collector plate 32. Thus, the area of the portion of the second current collector plate 32 in contact with the sidewall member 11 may be larger than that of the portion of the second current collector plate 32 in contact with the cap 16. Thus, compared to some other aspects of this disclosure, the heat generated in the sidewall member 11 by the laser may be dispersed and conducted more quickly through the second current collector plate 32, and the heat generated in the cap 16 by the laser may be dispersed and conducted rather slowly through the second current collector plate 32. Accordingly, the melting time of the sidewall member 11, which is relatively thinner than the bonding portion 17 of the cap 16, may be further delayed.

In addition, since a portion of the welding heat transmitted through the sidewall member 11 is dispersed through the second current collector plate 32, the phenomenon of heat being transferred to the separator 28 of the electrode assembly 20, which is in contact with the first inner surface 111 of the sidewall member 11, may be further reduced.

The thickness reduction part 161 of the cap 16 of the modified example is disposed further outward in the radial direction than the thickness reduction part 161 of the cap 16 of the previous aspect. Accordingly, a larger area of the cap body 160 may be accomplished. In addition, the thickness reduction part 161 is also provided in the form of an inclined surface such that the thickness reduction part 161 may guide the center alignment of the cap 16 during the insertion process of the cap 16 by being in contact with the second current collector plate 32.

According to the various above-described aspects, despite the wide range of welding processes, sealing force may be secured without perforation or liquid leakage, and welding performance may be improved. In addition, process stability may be increased by preventing thermal damage to cell components or separators caused by welding heat, and durability may also be increased by obtaining dimensional stability and bulging resistance by suppressing dimensional deformation due to inner pressure.

Hereinafter, with reference to FIGS. 7 to 10 and 16, an example of a manufacturing method of the above-described battery cell will be described.

According to the manufacturing method of the battery cell, the can 10 with the first electrode terminal 13 fixed to the bottom member 12 is prepared, and then the electrode assembly 20 having two ends in the axial direction bonded to the first current collector plate 31 and the second current collector plate, respectively, is prepared.

Thereafter, the electrode assembly 20 is accommodated into the can 10 with the first current collector plate 31 facing the bottom member 12. As a result, the second current collector plate 32 is located at the open end side of the can 10. In the process of accommodating the electrode assembly 20 in the can 10, the outer circumferential contact surface 325 of the can connecting part 324 provided at the radially outer edge of the second current collector plate 32 in the radial direction is brought into contact with second inner surface 115 of the sidewall member 11.

Here, the can connecting part 324 of the second current collector plate 32 is brought into contact with the inner diameter expansion part 113 of the sidewall member 11 such that adhesion strength of the current collector plate 32 to the radially inner surface of the sidewall member 11 is provided and the insertion depth of the second current collector plate 32 is regulated.

Next, the first current collector plate 31 and the first electrode terminal 13 are bonded.

Then, electrolyte solution is injected into the can 10.

After electrolyte injection is completed, with the open end of the sidewall member 11 covered with a cap 16, the outer circumferential bonding surface 171 and current collector plate contact surface 173 provided at the edge of the cap 16 are brought into contact with or made to face the second inner surface 115 of the sidewall member 11 and the cap contact surface 326 of the second current collector plate 32, respectively. In doing so, the thickness reduction part 161 having the form of an inclined surface provided on the underside of the cap 16 may be brought into contact with the second current collector plate 32 so as to align the center of the cap 16.

Thereafter, a laser is irradiated on the contact area between the second inner surface 115 of the sidewall member 11 and the outer circumferential bonding surface 171 of the cap 16 from outside the battery cell along the axial direction so as to weld the radially inner surface of the sidewall member 11, the outer circumferential bonding surface 171 of the cap 16, and the can connecting part 324 of the second current collector plate 32 to one another. Accordingly, the welding portion W bonds the sidewall member 11, the cap 16, and the second current collector plate 32 together.

During the welding process, the overhang part 117 of the sidewall member 11 that protrudes further outward in the axial direction than the cap 16 may melt and flow into the welding area between the radially inner surface of the sidewall member 11 and the outer circumferential bonding surface 171 of the cap 16.

The battery cell 72 manufactured through the welding structure and the welding process described above may be accommodated in the housing 71 of the battery pack 70, as shown in FIG. 17. The battery pack 70 may be constructed using one or more battery modules, each of which is an intermediate form of assembly that contains a plurality of battery cells 72. Alternatively, as shown, the battery pack 70 may be constructed directly of a plurality of battery cells 72 without any intervening battery modules.

Since the above-described battery cell 72 has a large volume, there is no particular difficulty in implementing the battery pack 70 even without using an intermediate structure such as a battery module. In addition, the battery cell 72 has less internal resistance and higher energy density than conventional battery cells. Accordingly, the energy density of the battery pack 70 including the battery cell 72 may be higher.

The battery pack 70 with such increased energy density may store the same energy, while reducing its volume and weight. Therefore, when the battery pack 70 to which the battery cell 72 is applied is mounted on a vehicle such as a car 80 that uses electricity as an energy source, as shown in FIG. 18, the driving range of the vehicle with respect to energy may be further expanded.

Although the seam welding structures and methods above were disclosed in the context of a cylindrical battery can, it should be appreciated that, within the scope of the present disclosure, such techniques could similarly be applied to other battery form factors. For example, the relevant battery cell need not have a circular cross-sectional profile orthogonal to the central longitudinal axis, but rather other cross-sectional shapes can be used, including oval, square, rectangular, partially circular, etc. Moreover, the central longitudinal axis need not be oriented orthogonally to the bottom member and/or the cap at respective opposing ends. As an example, the sidewall member of the can (along with the internal components of the can) may form a tube extending along an obliquely-oriented axis with respect to the plane defined by the bottom member and/or cap. Furthermore, the welding techniques disclosed herein could also be utilized outside of the context of cylindrical battery cans, and can also be applied to, for example, batteries having prismatic and pouch type form factors.

Among the nonlimiting benefits that may be provided by some or all aspects of the present disclosure are improved welding performance, in which the sidewall member, cap, and current collector plate can all be welded together to one another. Improved process stability for welding the sidewall member, cap, and current collector plate together may also result. Increased durability of the welding area between the sidewall member and the cap may also be obtained. Further, battery cell assembly time may be greatly reduced, at least by welding the sidewall member, the cap, and the current collector plate together as part of the same welding process.

The above-described aspects should be understood in all respects as illustrative and not restrictive, and the scope of the present disclosure will be represented by the claims rather than the detailed description given above. In addition, all changes and modifications derived from the equivalent concepts as well as the meaning and scope of the patent claims are to be construed as being included within the scope of the present disclosure.

As described above, the present disclosure has been described with reference to the illustrative drawings, but the present disclosure is not limited to any aspects and drawings disclosed herein, and various modifications may be made by those skilled in the art within the scope of the technical idea of the present disclosure. In addition, not all operational effects resulting from the present disclosure have been explicitly described and explained herein while explaining the aspects of the present disclosure, but a person having ordinary skill in the art would recognize such predictable effects.

What is claimed is:

1. A battery cell comprising:

a can having a sidewall circumscribing an internal volume and defining an opening to the internal volume at a first end of the can along a central longitudinal axis;

an electrode assembly received within the internal volume of the can;

a current collector plate electrically connected to the electrode assembly; and a cap covering the opening of the can so as to enclose the internal volume, wherein the current collector plate includes a central portion and a peripheral portion, the central portion being electrically connected to an electrode tab of the electrode assembly, and the peripheral portion positioned around the central portion and being spaced further from the central longitudinal axis than the central portion, the peripheral portion being in contact with a radially inner surface of the sidewall so as to be electrically connected with the can, and the peripheral portion being in contact with an underside of the cap facing into the internal volume along an axial direction that extends parallel to the central longitudinal axis, wherein the cap includes a central region and an annular region, the annular region positioned around the central region and being spaced further from the central longitudinal axis than the central region, wherein the underside of the cap in the central region is positioned further from the opening along the axial direction than the underside of the cap in the annular region, such that a thickness of the cap along the axial direction is smaller in the annular region than in the central region, and wherein the radially inner surface of the sidewall, a radially outer surface of the cap, and the peripheral portion of the current collector plate are welded to one another.

2. The battery cell of claim 1, wherein the radially inner surface of the sidewall includes a lateral step extending transverse to the central longitudinal axis such that a first inner surface of the sidewall positioned on a first side of the lateral step in the axial direction has a first diameter and a second inner surface of the sidewall positioned on a second side of the lateral step in the axial direction has a second diameter, the second side of the lateral step being closer to the opening than the first side, and the second diameter being larger than the first diameter, and wherein the radially outer surface of the cap and the peripheral portion of the current collector plate are in contact with the second inner surface.

3. The battery cell of claim 2, wherein an outer diameter of the peripheral portion of the current collector plate is larger than the first diameter of the first inner surface.

4. The battery cell of claim 2, wherein the peripheral portion of the current collector plate is in contact with the lateral step.

5. The battery cell of claim 2, wherein the lateral step is defined by an oblique surface extending from the first diameter of the first inner surface to the second diameter of the second inner surface.

6. The battery cell of claim 2, wherein a first thickness of the cap in the axial direction along the radially outer surface is larger than a second thickness of the sidewall in a radial direction along the second inner surface, the radial direction being perpendicular to the central longitudinal axis.

7. The battery cell of claim 6, wherein the first thickness is between one and two times thicker than the second thickness.

8. The battery cell of claim 1, wherein a diameter of the radially outer surface of the cap is smaller than a diameter of an adjacent portion of the radially inner surface of the sidewall, and wherein a welded region extends from the adjacent portion of the radially inner surface of the sidewall to the radially outer surface of the cap.

9. The battery cell of claim 1, wherein the annular region extends along the radially outer surface of the cap.

10. The battery cell of claim 1, wherein an inclined surface along the underside of the cap connects the annular region and the central region.

11. The battery cell of claim 10, wherein the inclined surface contacts the current collector plate.

12. The battery cell of claim 1, wherein the current collector plate includes a step in the axial direction between the central portion and the peripheral portion, such that the peripheral portion is offset towards the opening of the can relative to the central portion.

13. The battery cell of claim 1, wherein a longitudinal dimension of the central portion of the current collector plate extends transverse to the axial direction, and wherein a longitudinal dimension of the peripheral portion of the current collector plate extends parallel to the axial direction, such that the peripheral portion extends along the radially inner surface of the sidewall of the can to a terminal end of the peripheral portion that abuts the underside of the cap.

14. The battery cell of claim 12, wherein an inclined surface along the underside of the cap connects the annular region and the central region, and wherein the inclined surface contacts the current collector plate at the step.

15. The battery cell of claim 1, wherein the peripheral portion of the current collector plate is in contact with the underside of the cap in the annular region.

16. The battery cell of claim 15, wherein the peripheral portion of the current collector plate extends in a radial direction along the underside of the cap in the annular region, the radial direction being perpendicular to the central longitudinal axis.

17. The battery cell of claim 1, wherein the thickness of the cap along the axial direction in the annular region is from 0.4 to 0.8 times the thickness of the cap along the axial direction in the central region.

18. The battery cell of claim 1, wherein the thickness of the cap along the axial direction in the annular region is from 0.5 to 0.75 times the thickness of the cap along the axial direction in the central region.

* * * * *